United States Patent Office 2,982,363
Patented May 2, 1961

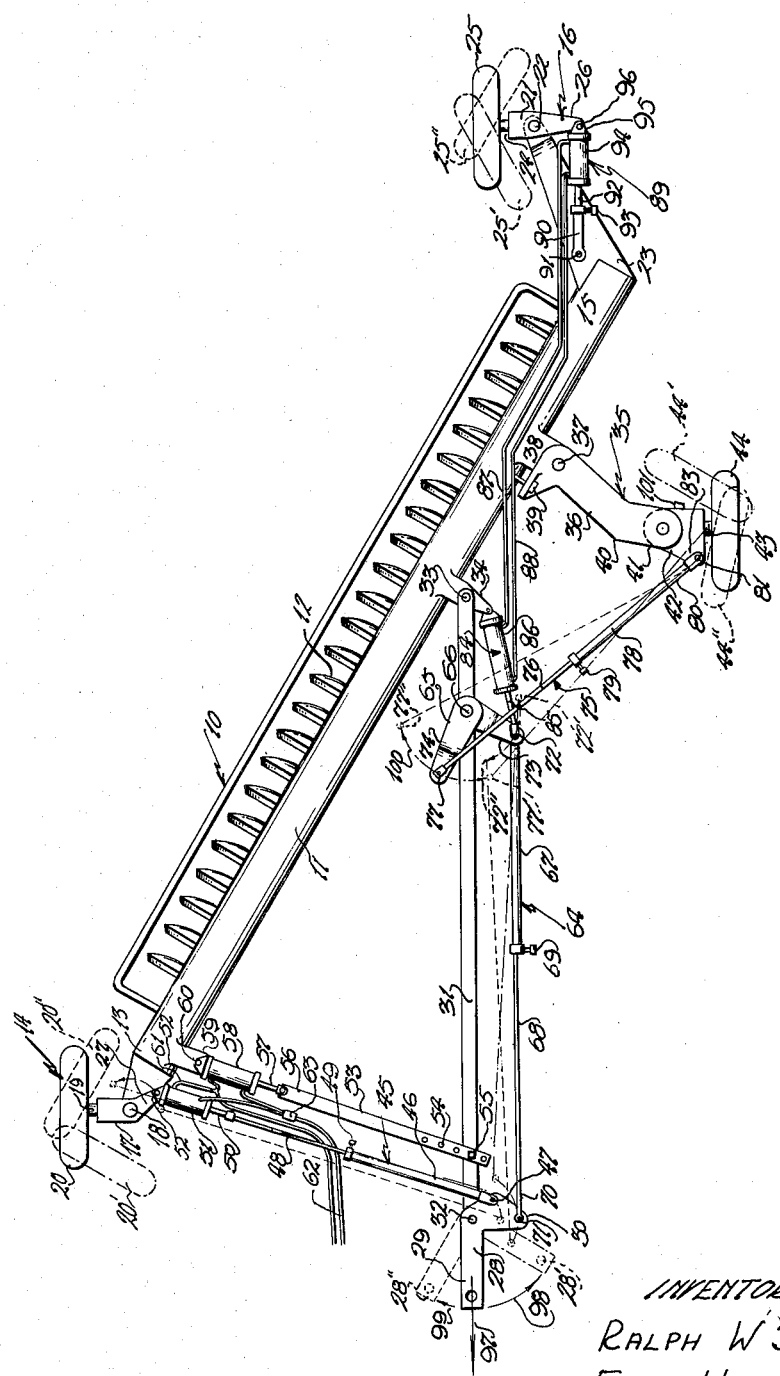

2,982,363

LAND WHEEL STEERING FOR ONE WAY PLOWS AND THE LIKE

Ralph Sweet, Forgan, Saskatchewan, and Earl Harbicht, Hughton, Saskatchewan, Canada Filed May 1, 1958, Ser. No. 732,212

11 Claims. (Cl. 172—284)

This invention relates to new and useful improvements in land wheel assemblies for one way disc plows and the like, particularly one way disc plows of considerable width in which steering is a problem.

Attempts have been made in the past to provide steering assemblies for relatively wide one way discs and although these may be satisfactory when making slight turns, nevertheless, considerable difficulty is encountered when relatively sharp turns are made either to the left or to the right. Furthermore, with conventional assemblies, the land wheel assembly of a conventional plow is often pulled sideways when sharp turns are made due to the relatively wide construction of such plows.

The principal object of our invention therefore is to provide a device of the character herewithin described which includes novel linkage means between the hitch and the front wheel assembly and the land wheel assembly whereby the linkage is enabled to go over center under certain conditions thereby relieving excessive side pressure on the land steering wheel.

Another object of our invention is to provide a device of the character herewithin described which incorporates hydraulic means between the hitch and the front wheel assembly whereby the relationship between the two may be adjusted by the operator in motion, said adjustment enabling the operator to adjust the draft action of the plow for varying conditions without stopping the machine and marking normal mechanical adjustments.

Yet another object of our invention is to provide a device of the character herewithin described which includes novel closed circuit double acting piston and cylinder components between the hitch assembly and the rear furrow wheel insuring at all times that there is a positive link yet eliminating conventional mechanical linkage.

Still another object of our invention is to provide a device of the character herewithin described which enables the wheels of the assembly to be turned through a total amount of approximately 120 degrees as compared to the conventional 90 degrees thereby facilitating the transporting of the plow and also facilitating the operation thereof in relatively confined areas.

With the foregoing objects in view, and such other objects and advantages as will become apparent to those skilled in the art to which this invention relates as specification proceeds, our invention consists essentially in the arrangement and construction of parts all as hereinafter more particularly described, reference being had to the accompanying drawing in which the figure is a top plan view of our device showing the relationship of the various components both in full line and in phantom, for the different conditions.

Proceeding therefore to describe our invention in detail, reference should be made to the accompanying drawing in which we have disclosed a one way disc assembly collectively designated 10, including a longitudinally extending main framework 11 carrying a plurality of discs 12 for rotation therein in the conventional manner.

Adjacent the left hand end 13 of the framework (with reference to the drawing) is provided a front wheel assembly collectively designated 14 and upon the opposite end 15 of the framework is provided a rear furrow wheel assembly collectively designated 16.

In detail, the front wheel assembly consists of a fork 17 journalled for horizontal pivotal movement by means of king pin 18, within the end 13 of the framework. This fork carries stub shaft 19 which is adapted to support for rotation the front wheel 20.

The rear furrow wheel assembly 16 consists of a fork 21 journalled for horizontal pivotal movement by means of a king pin 22 upon an offstanding member 23 extending from the end 15 of the framework. This fork also carries a stub shaft 24 upon which is journalled for rotation a rear furrow wheel 25 and it will be observed that both of the forks 21 and 17 include forwardly extending portions 26 and 27 respectively for steering purposes.

Forwardly of the framework 11 we have provided a hitch 28 taking the form of a bell crank having a main section 29 and a bell crank section 30 extending at right angles therefrom and it will be appreciated that the main portion 29 may be connected to a conventional towing means such as a tractor (not illustrated). A hitch link 31 is pivoted by one end thereof by means of pin 32 to the fulcrum point of the hitch 28, said hitch link extending rearwardly to be pivotally secured by means of pin 33 to an offstanding portion 34 extending forwardly of the main frame along the length thereof.

A land wheel assembly collectively designated 35 is provided and includes a beam 36 secured by means of pin 37 to an offstanding lug 38 from the main framework 11, anchor bolt 39 securing this beam in the correct angular relationship with the framework. This beam, which is angulated as at 40, carries upon the front end 41 thereof, a fork assembly 42 which in turn supports stub shaft 43 upon which the land wheel 44 is journalled for rotation, and referring back to the anchoring of the hitch link 31, it will be observed that this is anchored between the front wheel assembly 14 and the land wheel assembly 35 but substantially towards the said land wheel assembly.

Linkage means collectively designated 45 extends between the hitch 28 and the front wheel assembly 14 and takes the form of a telescopic tube 46 pivotally secured by means of pivot 47 to the bell crank portion 30 of the hitch as clearly shown. A rod 48 is telescopically fitted within the tube 46, the position being adjustably securable by means of clamp 49, and this rod extends forwardly and terminates in a piston rod 50 carrying a piston (not illustrated) adapted to reciprocate within a hydraulic cylinder 51. This hydraulic cylinder is in turn pivotally secured by pivot pin means 52, to the aforementioned portion 27 of the front fork 17.

A presetting link 53 is provided with a plurality of apertures 54 adjacent the front end thereof, by which means it can be pivotally secured to the aforementioned hitch link 31 by means of pivot bolt 55, and this presetting link run substantially parallel to the aforementioned linkage means 45. The rear end 56 of the presetting link 53 terminates with a piston rod 57 carrying a piston (not illustrated) adapted to reciprocate within a further hydraulic cylinder 58, the forward end of which is pivotally secured to an offstanding lug 59 from the framework, by means of pivot pin 60. The piston and cylinder assemblies 51 and 58 are of the double acting type and include a common conduit 61 extending from the cylinders forward of the pistons and extending to a source of hydraulic power (not illustrated) of the aforementioned towing means. A further common conduit 62 extends from each of the cylinders at the opposite side of the pistons and this conduit also extends to the source of hydraulic power hereinbefore mentioned. In this connection a conventional equalizing valve 63 is provided in one of the lines.

From the foregoing, it will be appreciated that the relationship between the front wheel assembly 14 and the hitch 28 can be preset initially by the telescopic action of the linkage 45 and by the adjustable provision of the presetting link 53, and that once this initial setting has been obtained, further setting can be obtained within limits by adjustment of the hydraulic source of supply acting upon the position of the pistons within the cylinders 51 and 58, the equalizing valve 63 insuring that these two pistons are in the same relationship one with the other at all times.

Further linkage means collectively designated 64 extends from the bell crank portion 30 of the hitch rearwardly to a further bell crank 65 pivotally mounted by means of pin 66 upon the aforementioned hitch link 31 and adjacent the rear end thereof. It will be observed that the linkage means 64 consists of a telescopic tube 67 and rod 68 slidable therein and clamped in the desired position by means of clamp 69. The front end 70 of the rod 68 is pivotally secured by means of pin 71 to the aforementioned bell crank portion 30 of the hitch but in a position outboard of the pivotal connection 47 of the tube 46, the purpose of which will hereinafter become apparent.

The tube 67 of the linkage means 64 is pivotally secured by means of pin 72 to one leg 73 of the bell crank 65, said leg extending forwardly in a direction substantially towards the land wheel assembly 35.

The opposite leg 74 of the bell crank 65 is situated substantially at right angles to leg 73 and faces approximately in the direction of the front wheel assembly 14 and further linkage means 75 extends between this leg 74 and the land wheel fork 42. This linkage consists of a rod 76 pivotally secured by means of pin 77 to the aforementioned leg 74 and sliding within a telescopic tube 78, being clamped into the desired position by means of clamp 79.

The other end 80 of the tube 78 is pivotally secured by means of pin 81 to an offstanding portion 83 of the fork 42 so that movement of the bell crank 65 will initiate corresponding movement of the fork 42.

Extending between the pivot pin 72 of the bell crank 65, and the aforementioned offstanding leg 34 from the main framework 11 is a hydraulic piston and cylinder assembly collectively designated 84. This consists of a piston rod 85 carrying a piston (not illustrated) reciprocal within the cylinder 86 and flexible conduits 87 and 88 extend from this cylinder 86 one upon each side of the piston therein.

This means that when hydraulic cylinders 51 and 58 are actuated by the operator as hereinbefore described, hitch link 31 is moved in a relatively small arc about its pivot 33. Due to the offset arrangement between pivot 33 and the pivotal attachment of cylinder 84, the bell crank 65 moves in a relatively small arc also. This affects the toeing position of the land wheel 44 and also the relative position of piston rod 85 within cylinder 84. This in turn affects the toeing-in relationship of rear furrow wheel 25 proportionately and permits the machine to narrow or widen at the operator's discretion.

Referring to the rear furrow wheel assembly 16 it will be observed that there is a further hydraulic piston and cylinder assembly collectively designated 89 extending between the offstanding portion 23 and the forward portion 26 of the fork 21. This assembly consists of a telescopic tube 90 pivotally secured by means of pin 91 to the aforementioned portion 23 and having a piston rod 92 and slidable therein and clamped into desired position by means of clamp 93. This piston rod carries a piston (not illustrated) upon the opposite end thereof, said piston being reciprocal within a cylinder 94, the rear end 95 of which is pivotally secured to the portion 26 of the fork 21 by means of pivot pin 96. The aforementioned conduits 87 and 88 each attach to this cylinder 94 one upon each side of the piston therein, corresponding conduits extending between corresponding positions on these two cylinders. This forms a closed circuit and is filled with hydraulic fluid and it will be observed that movement of bell crank 65 will initiate, through the hydraulic linkage, corresponding movement on the rear wheel 16 and that such movement can not take place without corresponding movement of the bell crank.

In operation, it will be observed from the drawing that the various parts are shown in full line and in two alternative positions illustrated in phantom. In the position shown in full line, the implement is being drawn in the direction of arrow 97 under which circumstances all three wheels 20, 44 and 25 are running substantially in the same direction. However, the draft angle of the machine can be varied by means of the hydraulic control operated from the towing means via the conduits 61 and 62 and as hereinbefore described, depending upon soil conditions encountered during operation and the weight of the associated grain drill (not illustrated).

If it is desired to turn to the left or in the direction of arrow 98, the towing means of the tractor turns to the left thus pivoting the hitch 29 upon pivot 32 so that it takes up the position, for example, shown in phantom by reference character 28'. This causes the piston within cylinder 51 to move towards the front wheel and due to the hydraulic fluid within this piston, the cylinder 51 also moves in this direction causing the front wheel to pivot and to take up the position illustrated in phantom by reference character 20'. By this action, linkage means 64 is moved rearwardly thus pivoting the bell crank 65 so that the pivot point 72 and 77 take up positions illustrated in phantom by the reference characters 72' and 77' respectively. This in turn causes linkage 78 to initiate similar movement in the land wheel assembly 35 so that the land wheel takes up the position shown in phantom by reference character 44'.

Also rod 85 moves the piston within cylinder 84 thus initiating similar movement to the piston within cylinder 94 and this in turn causes the rear furrow wheel to take up the position shown in phantom by reference character 25'.

If the device is turned to the left to a greater degree than illustrated, pivot point 47 passes over center of pivot 32, thus preventing wheel 20 from dragging sideways inasmuch as the movement of this wheel is now retracted slightly back towards the position shown in full line and the plow turns with the minimum amount of drag, most of the thrust being on the land wheel 44. At the same time, of course, plowing action proceeds as the draft angle is maintained.

If the hitch is turned to the right or in the direction of arrow 99, it takes up the position shown in phantom by reference character 28". This causes linkage 45 to reverse its action so that the front wheel then takes up the position shown in phantom by reference character 20".

Bell crank 65 also reverses its position and travels in the position of arrow 100 so that the pivot points 72 and 77 take up the positions illustrated in phantom by the references characters 72" and 77" respectively. This in turn, through the agency of linkage 78 causes the land wheel to take up the position shown in phantom by reference character 44". Furthermore, the action of the piston within cylinder 84 reverses and, through the closed system existing between this cylinder and cylinder 94, the rear furrow wheel takes up the position shown in phantom by reference character 25". It will be observed that when this right hand turn is extended, pivot 77 passes over center of pivot 66 and reverses the action of the land wheel 44 to prevent it dragging earth sideways, it being observed that the movement of this wheel then reverses its horizontal action back towards the position shown in full.

The over center action of pivot 47 and 77 in the left and right hand turn permit a full swing of approximately 120 degrees to be accomplished thus giving greater flexibility to the operation of the plow.

Finally, it will be observed that we have provided a stop 101 on the fork 42 carrying the land wheel, which stop prevents the land wheel from being turned beyond a certain limit, it being understood that this stop engages against the beam 36 and prevents any further turning action from occurring. It is at this point that the aforementioned pivot 47 passes over center of pivot 32 and permits the pressure to be released on the wheel 20.

When the hydraulic controls are operated through conduits 61 and 62, it will be observed that the presetting link 53 also initiates actions in the hitch link 31 pivoting around point 33 which in turn varies the relationship of the land wheel 44 due to the mounting of the bell crank 65 upon the hitch link. However, the amount of adjustment is less than the amount of adjustment in the front wheel due to the angularity of the linkage 78 between the bell crank and the land wheel assembly.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. In a disc plow including a main framework, a plurality of discs journalled for rotation in said framework and on the rear side thereof, a front wheel assembly journalled for rotation at one end of said framework and a rear furrow wheel assembly journalled for rotation at the other end of said framework, at least said front wheel assembly being mounted within a fork for steering action; a beam secured to said framework and extending forwardly therefrom on the side of said beam opposite to the side on which said discs are journalled, a land wheel assembly journalled for rotation on the leading end of said beam, said land wheel also being mounted for steering action within a fork attached to said beam, a hitch attachable to an associated towing means, a hitch link pivoted by one end thereof to the rear of said hitch and by the other end thereof to said framework between said beam and said front wheel assembly, said hitch being in the form of a bell crank, linkage means between one side of the said bell crank and said front wheel assembly, and further linkage means between said one side of said bell crank and said land wheel assembly, said further linkage means including a further bell crank pivotally supported on said hitch link whereby horizontal pivotal movement of said hitch initiates corresponding horizontal pivotal movement of said front wheel assembly and said land wheel assembly.

2. The device according to claim 1 in which the pivotal attachment of said linkage means extending between said bell crank hitch and said front wheel assembly is situated above the pivotal support of said bell crank hitch and on said one side of said bell crank thereby enabling said first mentioned attachment to pass over center of the bell crank hitch pivot when said bell crank hitch is moved towards said land wheel assembly.

3. The device according to claim 1 in which said second mentioned bell crank consists of two legs substantially at right angles to one another and extending forwardly, one of said legs being on one side of said hitch link and facing substantially toward said front wheel assembly, the other of said legs being on the other side of said hitch link and facing substantially towards said land wheel assembly, said linkage from said hitch being pivotally secured to said last mentioned leg, and further linkage extending between said first mentioned leg and said land wheel assembly, said links crossing over one another whereby said last mentioned linkage can pass over center of said attachment of said bell crank when said hitch is moved towards said front wheel assembly.

4. The device according to claim 1 which includes a hydraulic cylinder and piston means in said linkage means extending between said hitch and said front wheel assembly, and a presetting link extending between said framework adjacent said front wheel assembly and said hitch link, said presetting link lying substantially parallel to said last mentioned linkage means, and a hydraulic cylinder and piston means in said presetting link, both of said hydraulic cylinder and piston means being double acting and being connected in parallel with a source of hydraulic power on said towing means.

5. The device according to claim 2 in which said second mentioned bell crank consists of two legs substantially at right angles to one another and extending forwardly, one of said legs being on one side of said hitch link and facing substantially toward said front wheel assembly, the other of said legs being on the other side of said hitch link and facing substantially towards said land wheel assembly, said linkage from said hitch being pivotally secured to said last mentioned leg, and further linkage extending between said first mentioned leg and said land wheel assembly, said links crossing over one another whereby said last mentioned linkage can pass over center of said attachment of said bell crank when said hitch is moved towards said front wheel assembly.

6. The device according to claim 2 which includes a hydraulic cylinder and piston means in said linkage means extending between said hitch and said front wheel assembly, and a presetting link extending between said framework adjacent said front wheel assembly and said hitch link, said presetting link lying substantially parallel to said last mentioned linkage means, and a hydraulic cylinder and piston means in said presetting link, both of said hydraulic cylinder and piston means being double acting and being connected in parallel with a source of hydraulic power on said towing means.

7. The device according to claim 3 which includes a hydraulic cylinder and piston means in said linkage means extending between said hitch and said front wheel assembly, and a presetting link extending between said framework adjacent said front wheel assembly and said hitch link, said presetting link lying substantially parallel to said last mentioned linkage means, and a hydraulic cylinder and piston means in said presetting link, both of said hydraulic cylinder and piston means being double acting and being connected in parallel with a source of hydraulic power on said towing means.

8. The device according to claim 3 in which said rear furrow wheel is mounted in a fork for steering action, a double acting hydraulic piston and cylinder assembly extending between said second mentioned leg and said framework and operated by movement of said bell crank, a further double acting hydraulic piston and cylinder assembly between said rear furrow wheel assembly and said framework, a closed conduit extending between said cylinders from one side of the pistons thereof, and a further closed conduit extending between said cylinders upon the opposite side of said pistons whereby movement of one of said pistons initiates corresponding movement of the other of said pistons.

9. The device according to claim 5 in which said rear furrow wheel is mounted in a fork for steering action, a double acting hydraulic piston and cylinder assembly extending between said second mentioned leg and said framework and operated by movement of said bell crank, a further double acting hydraulic piston and cylinder assembly between said rear furrow wheel assembly and said framework, a closed conduit extending between said cylinders from one side of the pistons thereof, and a further closed conduit extending between said cylinders upon the opposite side of said pistons whereby movement of one of said pistons initiates corresponding movement of the other of said pistons.

10. The device according to claim 6 in which said rear furrow wheel is mounted in a fork for steering action, a double acting hydraulic piston and cylinder assembly extending between said second mentioned leg and said framework and operated by movement of said bell crank, a further double acting hydraulic piston and cylinder assembly between said rear furrow wheel assembly and said framework, a closed conduit extending between said cylinders from one side of the pistons thereof, and a further closed conduit extending between said cylinders upon the opposite side of said pistons whereby movement of one of said pistons initiates corresponding movement of the other of said pistons.

11. The device according to claim 7 in which said rear furrow wheel is mounted in a fork for steering action, a double acting hydraulic piston and cylinder assembly extending between said second mentioned leg and said framework and operated by movement of said bell crank, a further double acting hydraulic piston and cylinder assembly between said rear furrow wheel assembly and said framework, a closed conduit extending between said cylinders from one side of the pistons thereof, and a further closed conduit extending between said cylinders upon the opposite side of said pistons whereby movement of one of said pistons initiates corresponding movement of the other of said pistons.

References Cited in the file of this patent

UNITED STATES PATENTS

| | | |
|---|---|---|
| 810,620 | Cook | Jan. 23, 1906 |
| 1,015,544 | Cox | Jan. 23, 1912 |
| 1,024,675 | Buckwalter | Apr. 30, 1912 |
| 2,065,015 | Nielsen | Dec. 22, 1936 |
| 2,370,374 | Silver | Feb. 27, 1945 |
| 2,510,525 | Smart et al. | June 6, 1950 |
| 2,818,275 | Hollowell | Dec. 31, 1957 |

FOREIGN PATENTS

| | | |
|---|---|---|
| 636,135 | Great Britain | Apr. 26, 1950 |